(12) United States Patent
Janson

(10) Patent No.: US 8,485,078 B2
(45) Date of Patent: Jul. 16, 2013

(54) COMBINATION TABLE-MITER SAW SAFETY SYSTEM

(75) Inventor: John C. Janson, Plymouth, MI (US)

(73) Assignee: Robert Bosch Tool Corporation, Broadview, IL (US)

( * ) Notice: Subject to any disclaimer, the term of this patent is extended or adjusted under 35 U.S.C. 154(b) by 0 days.

(21) Appl. No.: 13/550,217

(22) Filed: Jul. 16, 2012

(65) Prior Publication Data

US 2012/0279368 A1 Nov. 8, 2012

Related U.S. Application Data

(63) Continuation of application No. 12/431,555, filed on Apr. 28, 2009, now Pat. No. 8,220,372.

(51) Int. Cl.
*B26D 5/00* (2006.01)
*B23D 33/02* (2006.01)

(52) U.S. Cl.
USPC .............................. 83/399; 83/477.2; 83/490

(58) Field of Classification Search
USPC ................. 83/399, 477.2, 477, 471.2, 471.1, 83/471.3, 462, 463, 491, 490; 144/48.2, 48.3, 144/48.6; 125/16.04
See application file for complete search history.

(56) References Cited

U.S. PATENT DOCUMENTS

| | | | |
|---|---|---|---|
| 3,509,789 A * | 5/1970 | Dye | 83/145 |
| 3,994,192 A | 11/1976 | Faig | |
| 4,754,276 A | 6/1988 | Carlson et al. | |
| 5,377,571 A * | 1/1995 | Josephs | 83/399 |
| 5,526,727 A | 6/1996 | Richards et al. | |
| 6,397,716 B1 | 6/2002 | Garuglieri | |
| 6,943,510 B2 | 9/2005 | Gorti | |
| 2003/0117095 A1 | 6/2003 | Gorti | |
| 2006/0011038 A1 | 1/2006 | Gehret et al. | |
| 2006/0048617 A1 | 3/2006 | Gehret et al. | |
| 2006/0117922 A1 | 6/2006 | Causse et al. | |
| 2006/0162523 A1 | 7/2006 | Hetcher et al. | |
| 2006/0201299 A1 | 9/2006 | Santa Ana | |
| 2008/0022825 A1 * | 1/2008 | Spinelli et al. | 83/471.3 |
| 2008/0066598 A1 | 3/2008 | Ouellette | |
| 2010/0237970 A1 * | 9/2010 | Liu | 335/295 |
| 2012/0186410 A1 * | 7/2012 | Lacy | 83/441 |

* cited by examiner

*Primary Examiner* — Sean Michalski
(74) *Attorney, Agent, or Firm* — Foley & Lardner LLP

(57) ABSTRACT

A combination table-miter saw including a base, an arm rotatably coupled to the base and moveable relative to the base between a first position and a second position, and a platform coupled to the arm and moveable relative to the arm between a first position and a second position. The combination table-miter saw also includes a safety device configured to allow the combination table-miter saw to function as a table saw when the arm is in the first position and to allow the combination table-miter saw to function as a miter saw when the platform is in the first position.

20 Claims, 9 Drawing Sheets

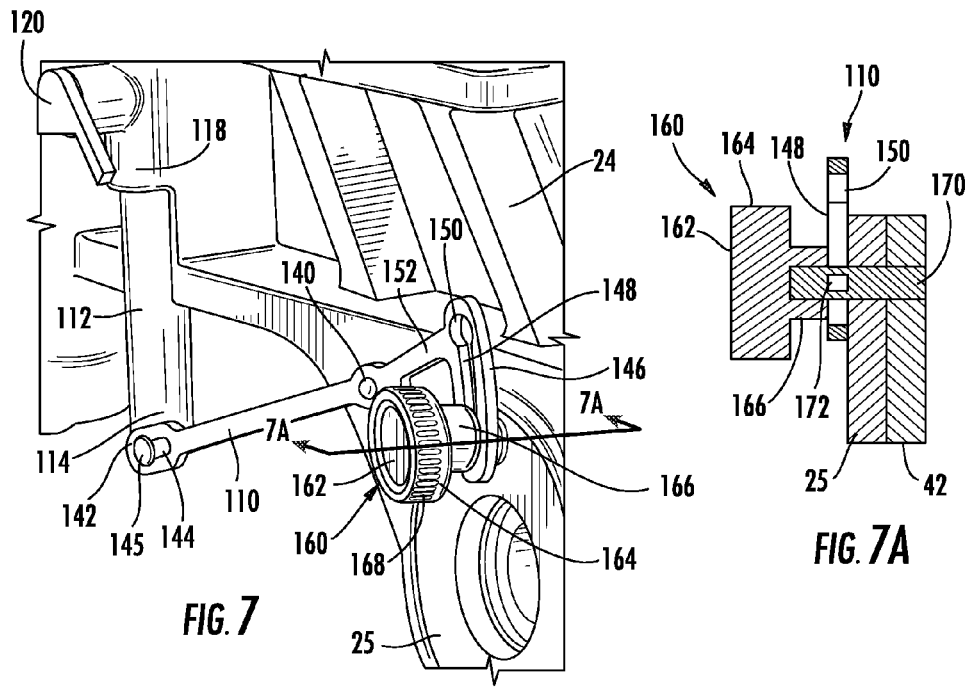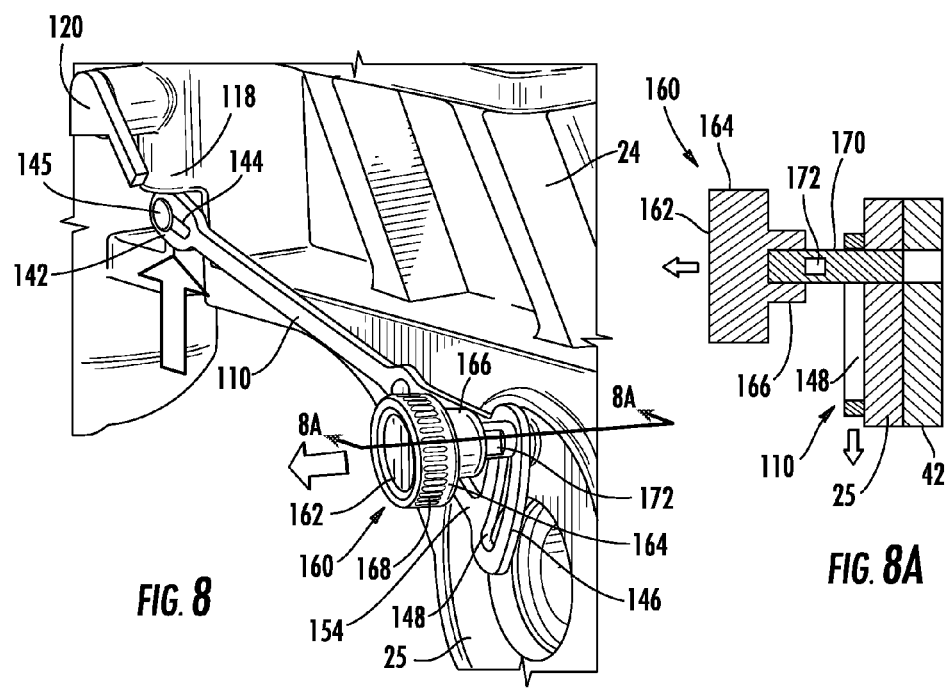

COMBINATION TABLE-MITER SAW SAFETY SYSTEM

CROSS-REFERENCE TO RELATED PATENT APPLICATIONS

This application is a Continuation of U.S. application Ser. No. 12/431,555, issued as U.S. Pat. No. 8,220,372, filed Apr. 28, 2009, titled "Combination Table-Miter Saw Safety System", which is incorporated herein by reference in its entirety.

BACKGROUND

The present disclosure relates generally to a combination table-miter saw. More specifically, the present disclosure relates to a combination table-miter saw incorporating a safety system.

A combination table-miter saw may be used in one mode of operation as a table saw and in a second mode of operation as a miter saw. Typically, a user must adjust or configure the combination table-miter saw into a table saw position or mode in order to use it as a table saw. Likewise, a user must adjust or configure the combination table-miter saw into a miter saw position or mode in order to use it as a miter saw.

It may be desirable for a combination table-miter saw that provides for increased safety when operating the combination table-miter saw in either the table saw mode or the miter saw mode. Specifically, one may desire a safety system or device that can be used with a combination table-miter saw to enable the combination table-miter saw to be used only as a table saw when in the table saw mode and only as a miter saw when in the miter saw mode.

It would be desirable to provide a combination table-miter saw and/or a safety system or device that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An embodiment of the innovation relates to a combination table-miter saw including a base, an arm rotatably coupled to the base and moveable relative to the base between a first position and a second position, and a platform coupled to the arm and moveable relative to the arm between a first position and a second position. The combination table-miter saw also includes a safety device configured to allow the combination table-miter saw to function as a table saw when the arm is in the first position and to allow the combination table-miter saw to function as a miter saw when the platform is in the first position.

Another embodiment of the innovation relates to a combination table-miter saw including a base, a support arm rotatably coupled to the base and moveable relative to the base between a first position and a second position, a locking device configured to be selectively actuated between a locked position and an unlocked position for securing the support arm in one of the first position and the second position, and a platform coupled to the support arm and moveable relative to the support arm between an upper position and a lower position. The combination table-miter saw also includes a safety device configured to monitor the position of at least one of the platform and the locking device. The safety device allows the combination table-miter saw to operate as a table saw when the locking device is in the locked position and to allow the combination table-miter saw to function as a miter saw when the platform is in the upper position.

Another embodiment of the innovation relates to a method for providing a safety system for a combination table-miter saw including providing a base, providing a support arm rotatably coupled to the base and moveable relative to the base between a first position and a second position, and providing a platform coupled to the support arm and moveable relative to the support arm between a first position and a second position. The method also includes providing a safety device configured to allow the combination table-miter saw to function as a table saw when the support arm is in the first position and to allow the combination table-miter saw to function as a miter saw when the platform is in the first position.

Alternative exemplary embodiments relate to other features and combinations of features as may be generally recited in the claims.

BRIEF DESCRIPTION OF THE DRAWINGS

FIG. 7 is a partial perspective view of the combination table-miter saw of FIG. 4 shown with a locking device in a locked position according to an exemplary embodiment.

FIG. 7A is a partial cross-sectional view of the locking device shown in FIG. 7, taken along line 7A-7A of FIG. 7.

FIG. 8 is a partial perspective view of the combination table-miter saw of FIG. 6, shown with the locking device in an unlocked position according to an exemplary embodiment.

FIG. 8A is a partial cross-sectional view of the locking device shown in FIG. 8 taken along line 8A-8A of FIG. 8.

DETAILED DESCRIPTION

Before turning to the figures which illustrate the exemplary embodiments in detail, it should be understood that the application is not limited to the details or methodology set forth in the following description or illustrated in the figures. It should also be understood that the terminology employed herein is for the purpose of description only and should not be regarded as limiting.

Referring generally to the figures, a combination table-miter saw 10 and components thereof are shown according to various exemplary embodiments. The combination table-miter saw 10 is selectively adjustable by a user between a first mode or miter saw position (i.e., for use in a miter saw or "chop saw" mode of operation) and a second mode or table saw position (i.e., for use in a table saw mode of operation). In the miter saw position or mode, the combination table-miter saw 10 is configured to provide a user with the functionality of a typical miter saw. Likewise, in the table saw position or mode, the combination table-miter saw 10 is configured to provide a user with the functionality of a typical table saw.

Figure 9:
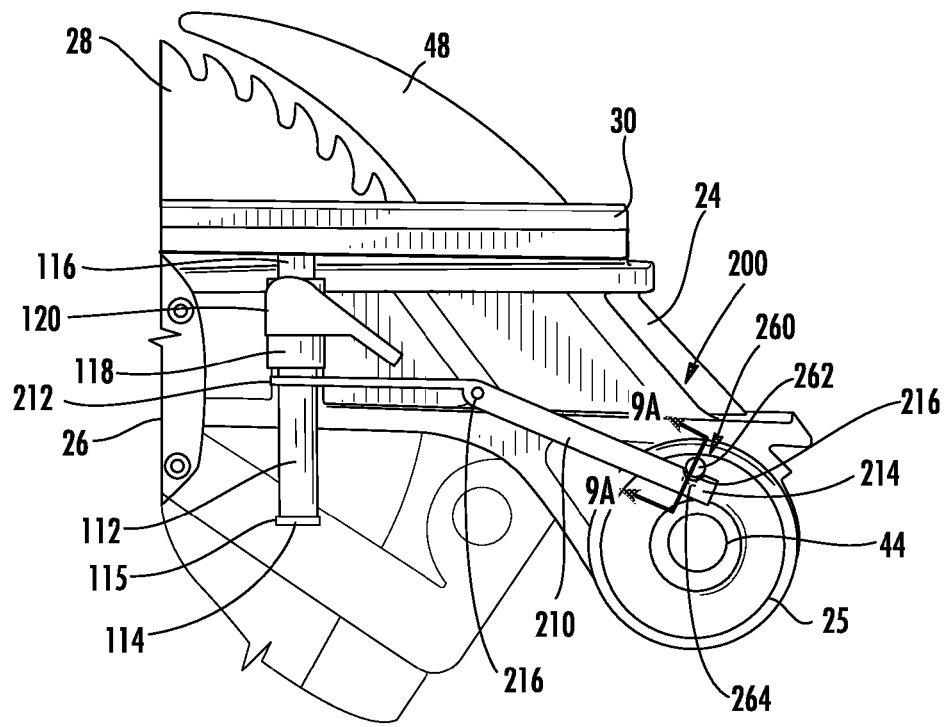
FIG. 9 is a partial side elevation view of a combination table-miter saw according to another exemplary embodiment, shown with a table in a lower position.
Figure 10:
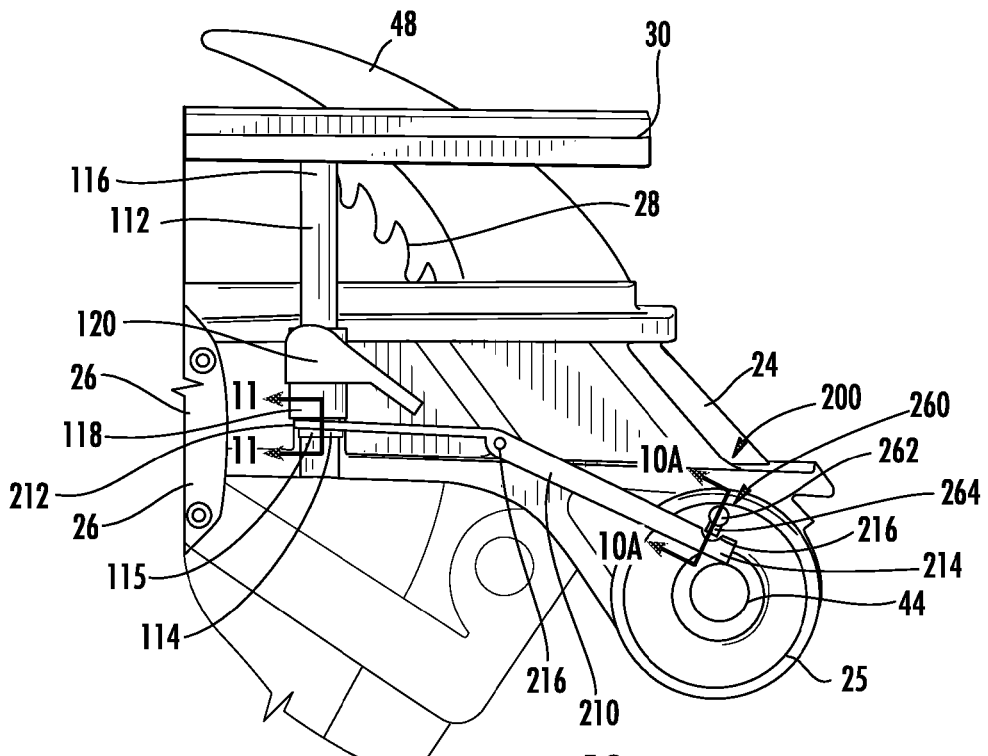
FIG. 10 is a partial side elevation view of the combination table-miter saw of FIG. 9, shown with the table in an upper position.

According to an exemplary embodiment, the combination table-miter saw 10 includes a safety system (e.g., safety system 100 as shown in FIGS. 4-8, safety system 200 as shown in FIGS. 9-11, or safety system 300 as shown in FIGS. 12-14). The safety system is configured to allow the combination table-miter saw to function or operate as a table saw only when the combination table-miter saw 10 is in the table saw position and to allow the combination table-miter saw to function or operate as a miter saw only when the combination table-miter saw 10 is in the miter saw position. The safety system may include mostly mechanical elements, or mostly electronic elements, or may include a combination of mechanical and electronic elements. The various safety systems will be discussed in more detail below.

Figure 1:
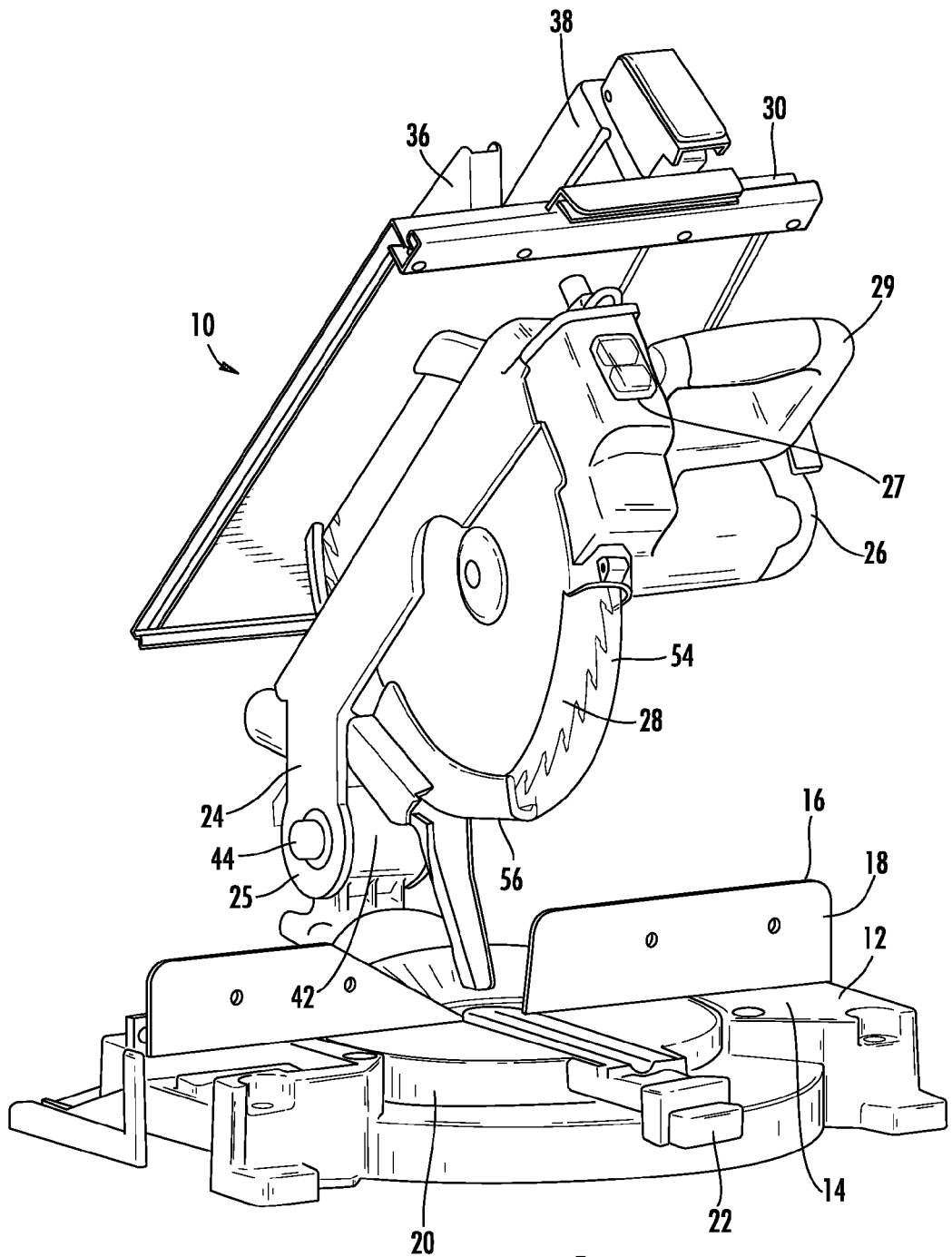
FIG. 1 is a perspective view of a combination table-miter saw according to an exemplary embodiment, shown in a miter saw position with the table in an upper position.
Figure 2:
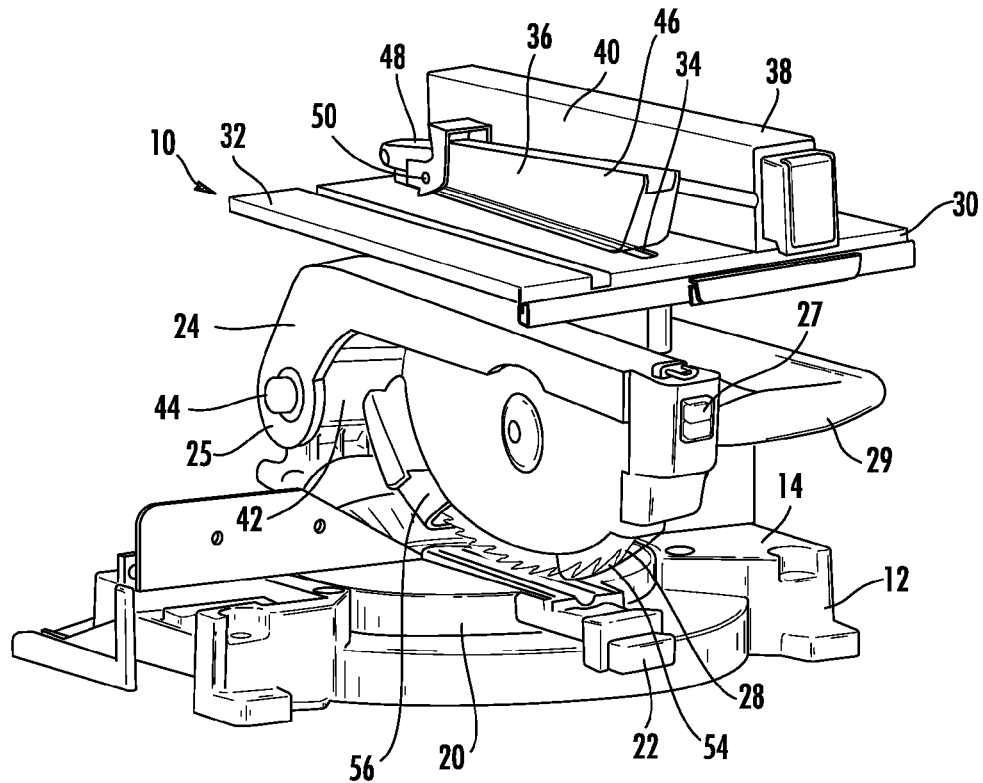
FIG. 2 is a perspective view of the combination table-miter saw of FIG. 1, shown in a table saw position with the table in an upper position.
Figure 3:
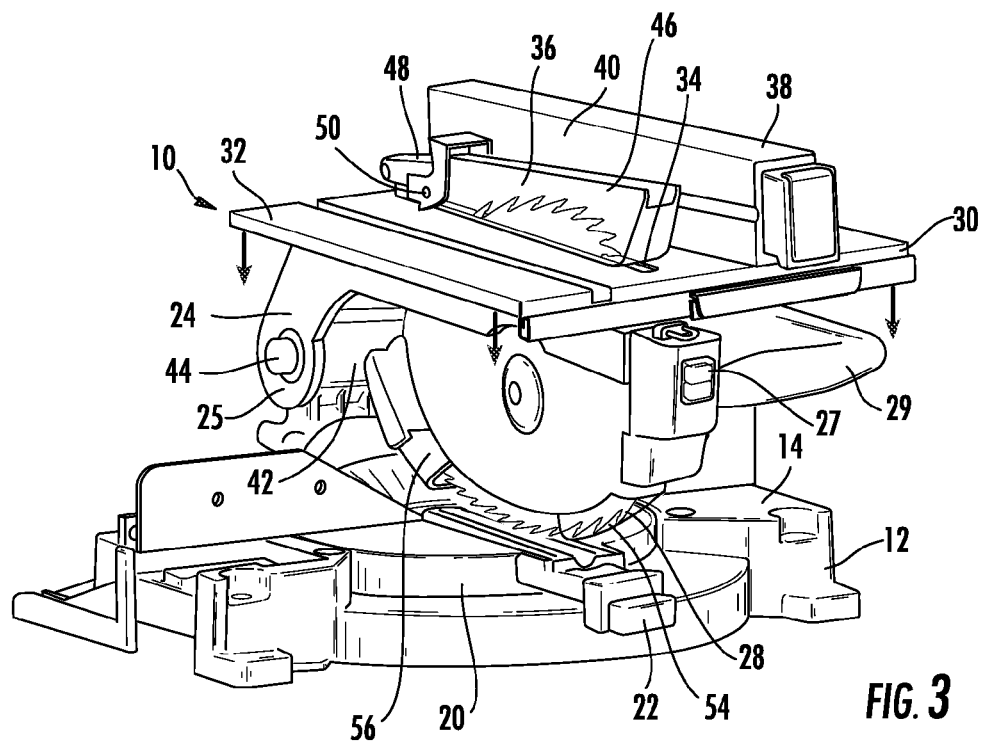
FIG. 3 is a perspective view of the combination table-miter saw of FIG. 2, shown in the table saw position with the table in a lower position.

Referring now to FIGS. 1-3, a combination table-miter saw 10 is shown according to an exemplary embodiment. The combination table-miter saw 10 includes a base 12 having a first workpiece support surface 14. A fence 16 is typically supported on the base 12 (e.g., by being adjustably mounted thereto, etc.). The fence 16 has a second workpiece support surface 18.

According to an exemplary embodiment, the first workpiece support surface 14 and the second workpiece support surface 18 are both generally planar surfaces that are orientated substantially perpendicular to each other. According to the embodiment illustrated, the first workpiece support surface 14 extends in a substantially horizontal plane, while the second workpiece support surface 18 extends in a substantially vertical plane. When the combination table-miter saw 10 is in the miter saw position or mode (shown in FIG. 1), the workpiece (not shown) is intended to be supported on the first workpiece support surface 14 and positioned against the second workpiece support surface 18.

The combination table-miter saw 10 also includes a table 20 that is rotatably supported at the base 12 and an adjustment device 22 (e.g., handle, lever, etc.) for allowing the user to selectively adjust the position of the table 20 relative to the base 12. The table 20 rotates about a substantially vertical axis of rotation when the combination table-miter saw 10 is in its typical orientation for operation. Supported at a rear portion of the table (e.g., a side opposite the adjustment device 22, etc.) is an arm 24 (e.g., support arm, member, etc.). The arm 24 holds a motor housing or saw unit 26 having a circular cutting tool, shown as a toothed blade 28.

The arm 24 includes a structure or end 25 that is configured to be rotatably coupled with a structure or support 42 of the base 12. For example, a shaft 44 may couple the end 25 of the arm 24 to the support 42 of the base 12. Attached to the arm 24 is a first guard 54 (e.g., a retractable guard) and a second guard 56 (e.g., a fixed guard). Guards 54, 56 aid in covering the blade 28 when the combination table-miter saw 10 is in the miter saw position shown in FIG. 1.

When a user operates the combination table-miter saw 10 by lowering the saw unit 26 (and thus the blade 28) to cut a workpiece (not shown), the first guard 54 rotates up and to the rear of the saw unit 26 to expose the blade 28. When the work piece is finished being cut and the saw unit 26 returns to its beginning miter saw position (as shown in FIG. 1), the first guard 54 rotates back down to cover the blade 28.

The table 20 is rotatably adjustable relative to the second workpiece support surface 18 so that the table 20 (and the saw unit 26 mounted relative thereto) can be angularly positioned to set a desired miter cut angle. The arm 24 is movably (e.g., pivotally, etc.) mounted relative to the first workpiece support surface 14 to permit the saw unit 26 to be selectively moved upwards and downwards to cut a workpiece (not shown) on the first workpiece support surface 14. According to an exemplary embodiment, the arm 24 is also mounted to permit a lateral angular adjustment to tilt the blade 28.

According to an exemplary embodiment, the saw unit 26 is made of an electrically insulating material, such as hard plastic. An electric motor (not shown) is enclosed within the saw unit 26. The motor receives electrical power from a power source (e.g., through an electrical cord and/or via an energy storage device such as a battery, etc.). The electric motor is turned on and off by a power on/off switch 27 supported at a front portion of the saw unit 26. Also supported at the front portion of the saw unit 26 is a handle 29 that can be grasped by a user to selectively move the saw unit 26 (and thus the blade 28) relative to the base 12.

In addition to facilitating the cutting of a workpiece when the combination table-miter saw 10 is in the miter saw position or mode, rotational movement of the arm 24 relative to the base 12 also allows the combination table-miter saw 10 to be selectively moved from the miter saw position to the table saw position (e.g., shown in FIGS. 2 and 3). To achieve the table saw position, the saw unit 26 is rotated down, toward the base 12 and is locked or otherwise secured in such a position or mode (e.g., by a shaft or pin such as locking device 160, as shown in FIG. 8).

To facilitate its functionality as a table saw, the combination table-miter saw 10 further includes a table or platform 30 that is supported at a top portion of the saw unit 26 as seen in FIGS. 2 and 3. The platform 30 extends outward from the saw unit 26 and has a third workpiece support surface 32 that defines an aperture or slot 34 that allows the blade 28 to pass through the third workpiece support surface 32 and engage a workpiece (not shown). The slot 34 allows the same cutting tool (e.g., blade 28) that is used in the miter saw mode to be used in the table saw mode.

The combination table-miter saw 10 also includes a cover or guard 36 that at least partially conceals the portion of blade 28 extending through the slot 34. The guard 36 includes a first portion 46 and a second portion 48. The first portion 46 is movably or rotatably coupled to the second portion 48 at a pivot 50. According to an exemplary embodiment, the first portion 46 may be constructed from a transparent material (e.g., a clear plastic), while the second portion 48 may be constructed from an opaque material (e.g., a metal). According to other exemplary embodiments, the first portion 46 and the second portion 48 may be constructed from any suitable material.

The guard 36 is configured to move when engaged by the workpiece (not shown) that is intended to be cut in the table saw mode of operation so that the blade 28 can engage the workpiece. As the workpiece approaches the blade 28, the workpiece engages the leading edge of the first portion 46 of the guard 36 and the guard is lifted or rotated upward relative to the third workpiece support surface 32 to permit the blade 28 to engage the workpiece and make the desired cut.

A second fence 38 is supported on the platform 30 (e.g., by being adjustably mounted thereto, etc.). The second fence 38 has a fourth workpiece support surface 40 that is configured to be substantially parallel with a cutting edge of the blade 28. According to an exemplary embodiment, the third workpiece support surface 32 and the fourth workpiece support surface 40 are both generally planar surfaces that are orientated substantially perpendicular to each other. According to the embodiment illustrated, the third workpiece support surface 32 extends in a substantially horizontal plane and the fourth workpiece support surface 40 extends in a substantially vertical plane when the combination table-miter saw 10 is in the table saw position.

Referring now to FIGS. 4-8, the combination table-miter saw 10 is shown in the table saw position, with the arm 24 locked into place (e.g., by a locking device 160 as shown in FIGS. 7-8) so that the arm 24 may not rotate about the shaft 44. While in the table saw position, the combination table-miter saw 10 may be operated as a table saw. Specifically, the platform 30 may be raised or lowered as needed to adjust the exposed height of the blade 28.

Figure 4:
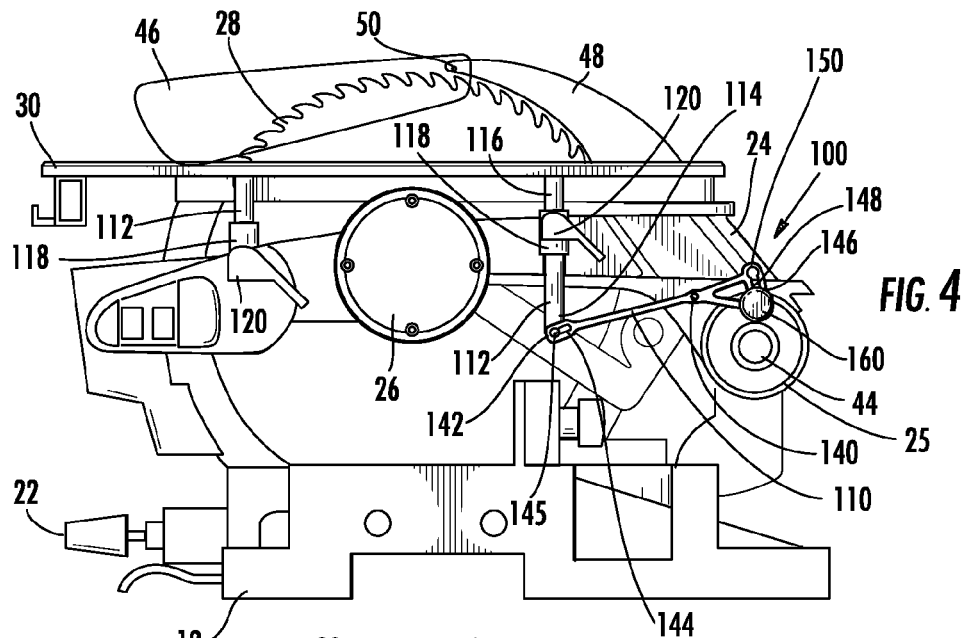
FIG. 4 is a side elevation view of a combination table-miter saw according to another exemplary embodiment, shown in the table saw position with the table in a lower position.
Figure 5:
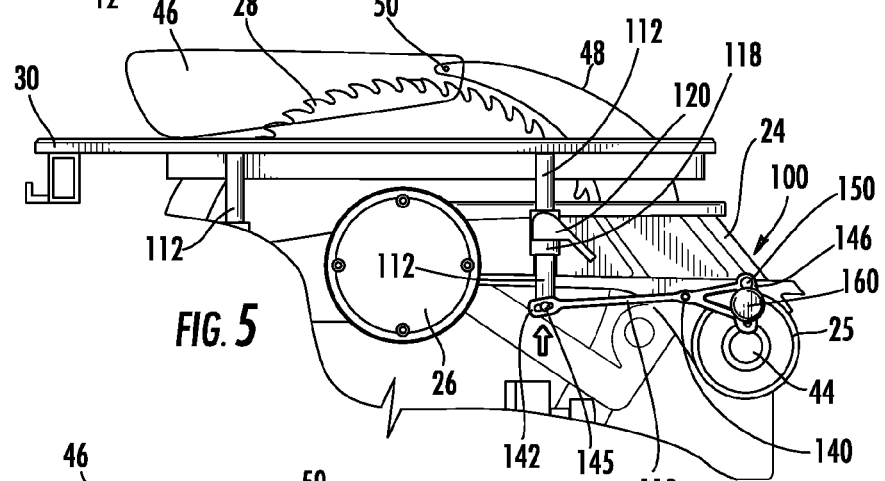
FIG. 5 is a partial side elevation view of the combination table-miter saw of FIG. 4, showing the table in an intermediate position between the lower position and an upper position.
Figure 6:
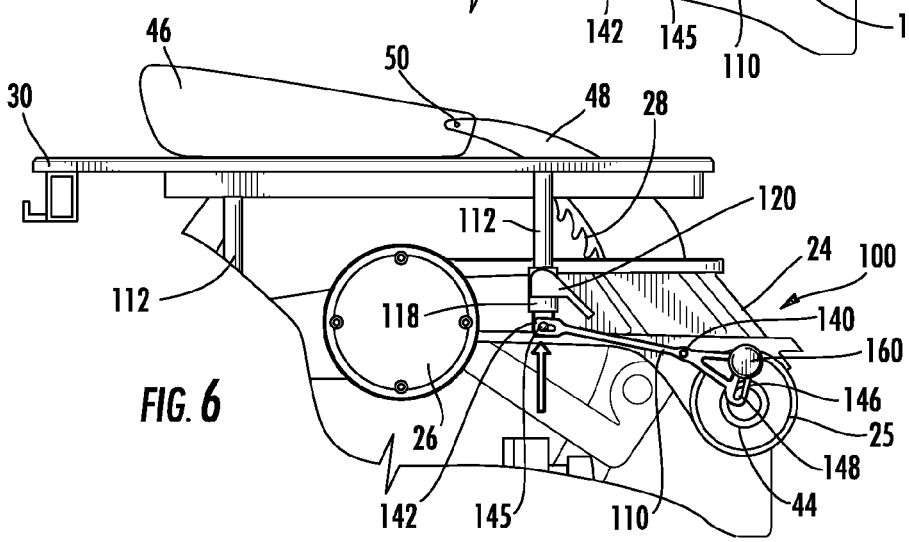
FIG. 6 is a partial side elevation view of the combination table-miter saw of FIG. 4, showing the table in the upper position.

For instance, as shown in FIG. 4, the platform 30 is in a fully lowered position, exposing the maximum height of the blade 28. FIG. 5 shows the platform 30 at an interim position between the fully lowered position and a fully raised position. FIG. 6 shows the platform 30 at the fully raised position, fully covering the blade 28. According to another exemplary embodiment, the platform 30 may expose only a small portion of the blade 28 when the platform 30 is at the fully raised position, with the guard 36 (e.g., as shown in FIG. 2) fully covering the blade 28.

The platform 30 may be movably coupled to arm 24 by a structure or support shown as a rod 112 (e.g., support rod, member, etc) or, preferably, a plurality of rods 112. The rod 112 has a first end 114 and a second end 116 coupled to the platform 30. The rod 112 is received in a structure or guide 118 and is configured to support or guide the rod 112 as it moves in a generally vertical direction. One or more locking devices 120 may be provided to cooperate with guide 118 to lock or otherwise secure the rod 112 at a desired position or height.

According to an exemplary embodiment, the platform 30 may be raised and/or lowered by loosening the locking devices 120 and manually moving the platform 30 to the desired position. According to another exemplary embodiment, the platform 30 may be raised or lowered by engaging an adjustment device (not shown) such as a hand crank or the like. The adjustment device may be operated manually (e.g., by hand) or automatically (e.g., by a servo motor).

Still referring to FIGS. 4-8, the combination table-miter saw 10 includes a locking device 160 configured to substantially lock the arm 24 in a first position (i.e., in a table saw mode or position). When the locking device 160 is engaged (i.e., in a locked position), the arm 24 is substantially prevented from rotating about the shaft 44. When the locking device 160 is disengaged (i.e., in an unlocked position), the arm 24 may rotate (relative to the base 12) from the first position to a second position and any position intermediate these two positions in order to allow operation of the combination table-miter saw 10 as a miter saw.

As shown in FIGS. 7-8, the locking device 160 includes a knob 162 having a first diameter 164 and a second diameter 166. According to an exemplary embodiment, the second diameter 166 is smaller than the first diameter 164. According to another exemplary embodiment, the knob 162 includes a plurality of ridges 168 (projections, bumps, etc.) about the first diameter 164. The ridges 168 may be configured to aid a user's grip on the knob 162 when locking and/or unlocking the locking device 160.

The locking device 160 further includes a member or shaft shown as a pin 170, a first end of the pin 170 being coupled to the knob 162. A second end of the pin 170 is received by an aperture in the end 25 of the arm 24 and, when the arm 24 is in the table saw position, by an aperture in the structure 42 of the base 12, as shown in FIG. 7A. Locking (engaging, activating, etc.) the locking device 160 as seen in FIGS. 7 and 7A substantially locks the arm 24 with respect to the base 12. Unlocking (deactivating, disengaging, etc.) the locking device 160 as seen in FIGS. 8 and 8A allows the arm 24 to rotate relative to the base 12.

Referring to FIGS. 4-8, the combination table-miter saw 10 is shown to include a safety device or system 100 according to an exemplary embodiment. The safety system 100 is configured to allow the combination table-miter saw 10 to function or operate only as a table saw when the combination table-miter saw 10 is in the table saw position (see, e.g., FIGS. 4-5). Additionally, the safety system 100 is configured to allow the combination table-miter saw 10 to function or operate only as a miter saw when the combination table-miter saw 10 is in the miter saw position (see, e.g., FIG. 6).

Specifically, the safety system 100 is configured to allow the combination table-miter saw 10 to only function or operate as a table saw when the arm 24 is in a first or locked position (i.e., table saw mode or position) and to only function or operate as a miter saw when the platform 30 is in a first or fully raised position (i.e., the miter saw mode or position).

When the platform 30 is at the fully raised position, and the locking device 160 is in the unlocked position, the combination table-miter saw 10 may be used as a miter saw. To use the combination table-miter saw 10 as a table saw, the locking device 160 must be moved to the locked position to lock the arm 24 into the table saw position. Thus, once the locking device 160 is in the locked position, the combination table-miter saw 10 may be used as a table saw, regardless of the position of the platform 30. In other words, the combination table-miter saw 10 may be used as a table saw with the platform 30 in either the fully raised position or the fully lowered position (or anywhere in between), as long as the locking device 160 is in the locked position.

The safety system 100 includes a member or device shown as a lever 110 having a first end 142 and a second end 146 opposite the first end 142. As seen in FIGS. 4-8, the first end 142 defines an opening or slot 144 configured to receive a fastener or other retaining device shown as a rivet 145. The rivet 145 slidably couples the first end 142 of the lever 110 to the first end 114 of the rod 112. The second end 146 of the lever 110 defines an opening or slot 148 and the slot 148 is configured to receive the locking device 160.

The lever 110 is rotatably coupled to the arm 24 at a pivot 140 (e.g., with a fastener). According to an exemplary embodiment, the lever 110 includes a first member or arm 152 and a second member or arm 154 connecting the pivot 140 of the lever 110 to the second end 146 of the lever 110. According to other exemplary embodiments, more or less arms may be used to connect the pivot 140 to the second end 146.

When the platform 30 is raised up (e.g., as shown in succession in FIGS. 4-6), the first end 114 of the rod 112 also moves up. The first end 142 of the lever 110, being slidably coupled with the first end 114 of the rod 112, also moves up. When the first end 142 of the lever 110 moves up, the lever 110 rotates (clockwise) about the pivot 140 causing the second end 146 of the lever 110 to move down.

As shown in FIG. 4, the platform 30 is shown in its fully lowered position. The first end 142 of the lever 110 is also at its lowest position, while the second end 146 of the lever 110 is at its highest position. As the table moves up, as shown in FIG. 5, the first end 142 of lever 110 also moves up causing the second end 146 of the lever 110 to move down. As shown in FIG. 6, the platform 30 is at its fully raised position. Correspondingly, the first end 142 of the lever 110 is at its highest position and the second end 146 of the lever 110 is at its lowest position.

When the platform 30 is in its fully raised position (e.g., as shown in FIG. 6), and, correspondingly, the second end 146 of the lever 110 is in its lowest position, an enlarged end 150 of the slot 148 is aligned with the pin 170 of the locking device 160. According to an exemplary embodiment, an internal diameter of the enlarged end 150 corresponds to an external diameter of the pin 170, allowing the pin 170 (and the locking device 160) to be moved from the locked position (FIGS. 7-7A) to the unlocked position (FIGS. 8-8A).

When the locking device 160 is pulled out to its unlocked position as shown in FIGS. 8 and 8A, the platform 30 may not be lowered. This is because the slot 148 defined by the second end 146 of the lever 110 is restricted by the pin 170 of the locking device 160 (due to the fact that the external diameter of the pin 170 is larger than the internal dimension of the slot 148). Additionally, when the platform 30 is in any position but the fully raised position, the lever 110 prevents the locking device 160 from being moved from the locked position to the unlocked position.

Thus, when the locking device 160 is pulled out, the combination table-miter saw 10 may only be used as a miter saw (i.e., the arm 24 may be raised and lowered, but the platform 30 may not be lowered). Once the locking device 160 is moved from the unlocked position to the locked position, the combination table-miter saw 10 may only be used as a table saw (i.e., the platform 30 may be raised and lowered, but the arm 24 may not be raised or lowered). With the locking device 160 in its locked position, (as shown in FIGS. 7 and 7A), a cutout 172 on the pin 170 aligns with the slot 148. This allows the lever 110 to be rotated (counterclockwise), allowing the platform 30 to be lowered.

According to an exemplary embodiment, the locking device 160 is not biased (e.g., by a spring) in either the locked or unlocked position. According to other exemplary embodiments, the locking device 160 may be biased by a conventional spring or other suitable biasing means in either the locked or unlocked position.

Referring now to FIGS. 9-11, the combination table-miter saw 10 is shown according to another exemplary embodiment to include a safety system 200. The safety system 200 comprises a member or lever 210 having a first end 212 and a second end 214 opposite of the first end 212. The lever 210 is rotatably coupled to the arm 24 of the combination table-miter saw 10 at a pivot 216 (e.g., with a fastener).

Figure 11A:
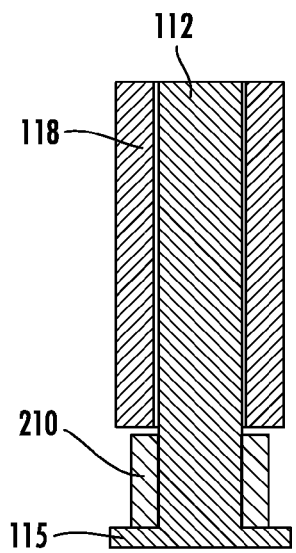
FIG. 11A is a partial cross-section view of a safety device according to an exemplary embodiment, taken along line 11-11 in FIG. 10.
Figure 11B:
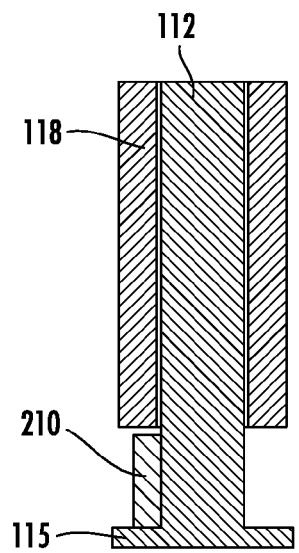
FIG. 11B is a partial cross-section view of the safety device according to another exemplary embodiment, taken along line 11-11 in FIG. 10.

According to an exemplary embodiment, the lever 210 is biased in a first or locked position, as shown in FIG. 9. However, when the platform 30 is at its fully raised position, as shown in FIG. 10, the first end 212 of the lever 210 interacts with a projection 115 on the first end 114 of the rod 112. According to an exemplary embodiment, the projection 115 "pushes-up" the second end 212 of the lever 210. According to an exemplary embodiment, the projection 115 may be located all around the circumference of the rod 112 (e.g., as shown in FIGS. 11A and 11B). According to another exemplary embodiment, the projection 115 may be located on only one side (i.e., the front side) of the rod 112. According to an exemplary embodiment, the second end 212 of the lever 210 may fully encircle the rod 112 (e.g., as shown in FIG. 11A), or may only be located on one side (i.e., the front side) of the rod 112, as shown in FIG. 11B.

Figure 9A:
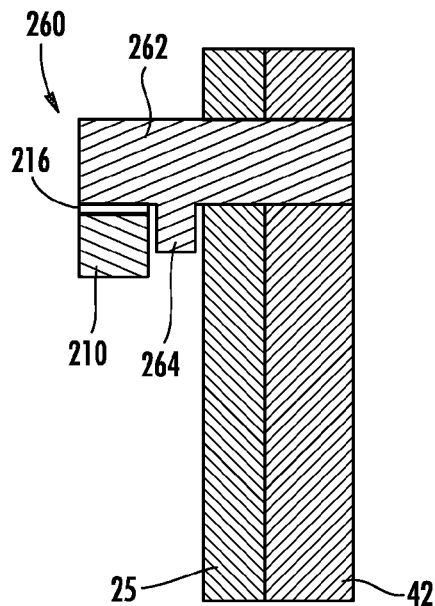
FIG. 9A is a partial cross-sectional view of a locking device shown in a locked position according to an exemplary embodiment, taken along line 9A-9A of FIG. 9.

As shown in FIGS. 9-10, the combination table-miter saw 10 includes a locking device 260. The locking device 260 comprises a shaft or pin 262 having a projection 264 (ridge, protrusion, protuberance, etc.). When the locking device 260 is in a locked position (e.g., as shown in FIGS. 9 and 9A), the locking device 260 locks the rotational movement of the arm 24 relative to the base 12 (by locking the end 25 of the arm 24 to the structure 42 of the base 12). This allows the combination table-miter saw 10 to be used as a table saw. When the locking device 260 is in the unlocked position, (e.g., as shown in FIGS. 10 and 10A), the arm 24 is free to rotate relative to the base 12 which allows the combination table-miter saw 10 to be used as a miter saw.

Figure 10A:
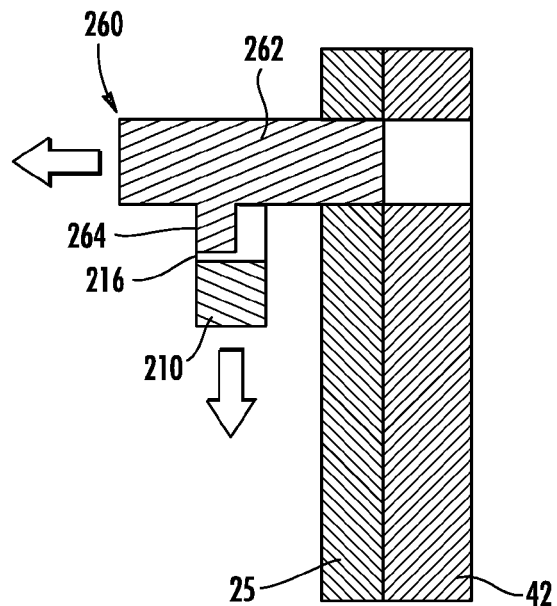
FIG. 10A is a partial cross-section view of the locking device shown in an unlocked position according to an exemplary embodiment, taken along line 10A-10A in FIG. 10.

In order to move the locking device 260 from its locked position (as shown in FIG. 9A) to its unlocked position (as shown in FIG. 10A), the platform 30 must be in its fully raised position (as shown in FIG. 6). When the platform 30 is in its fully raised position, the second end 212 of the lever 210 is in a position to interact with or engage the projection 115 of the rod 112, causing the lever 210 to rotate clockwise to allow the projection 264 of the locking device 260 to clear a notch or cutout 216 of the lever 210. The second end 214 of the lever 210 comprises a notch or cutout 216. The cutout 216 is configured to interact with or engage the locking device 260. The locking device 260 may then be pulled out to the unlocked position.

Once the locking device 260 is in its unlocked position (as shown in FIG. 10A) the platform 30 may not be lowered due to the fact that the projection 264 of the locking device restricts the lever 210 from rotating counter-clockwise back to its locked position. The locking device 260 must be pushed back into its locked position (as shown in FIG. 9A) before platform 30 may be lowered.

Referring now to FIGS. 12-14, the combination table-miter saw 10 is shown according to another exemplary embodiment to include a safety system 300. The safety system 300 includes a first switch 312 (proximity switch, micro switch, position switch, etc.) and a second switch 314 (proximity switch, micro switch, position switch, etc.) located inside a terminal box 310. The terminal box 310 may be coupled to the combination table-miter saw 10, for example, as shown in FIGS. 12-14.

The terminal box 310 is configured to receive a power cord 316 that provides electrical power to the combination table-miter saw 10. The power cord 316 includes a connector 318 (e.g., a standard 3-prong 110V plug-in connector). The terminal box 310 is configured to connect the saw unit 26 of the combination table-miter saw 10 to an electrical grid (not shown). According to an alternative embodiment, the terminal box 310 may not include the power cord 316 and instead be configured to connect the saw unit 26 to a battery or battery pack.

As shown in FIGS. 12-14, the combination table-miter saw 10 further includes a locking device 320 configured to retain or lock the arm 24 of the combination table-miter saw 10 in the table saw position when the locking device 320 is in a locked position. When the locking device 320 is in an unlocked position, the arm 24 of the combination table-miter saw 10 may freely rotate with respect to the base 12. The combination table-miter saw 10 further includes a rod 112 (similar to the rod shown in FIGS. 9-11). The rod 112 has a first end 114 having a projection 115 and a second end 116 opposite of the first end 114 that is coupled to the platform 30.

The safety system 300 is configured to prevent a user from operating the unit as a miter saw if the platform 30 is not fully raised up and to prevent the user from operating the unit as a table saw if the locking device 320 is not in the locked position. The safety system 300 accomplishes this because the switch 312 monitors the position of the rod 112 (which corresponds to the position of the platform 30) and the switch 314 monitors the position of the locking device 320 (which corresponds to the position of the arm 24). The switches 312, 314 in the terminal block 310 are wired or connected such that when either the switch 312 (switch A) or the switch 314 (switch B) are closed, power is transmitted to saw unit 26 in order to power the combination table-miter saw 10.

Figure 12A:
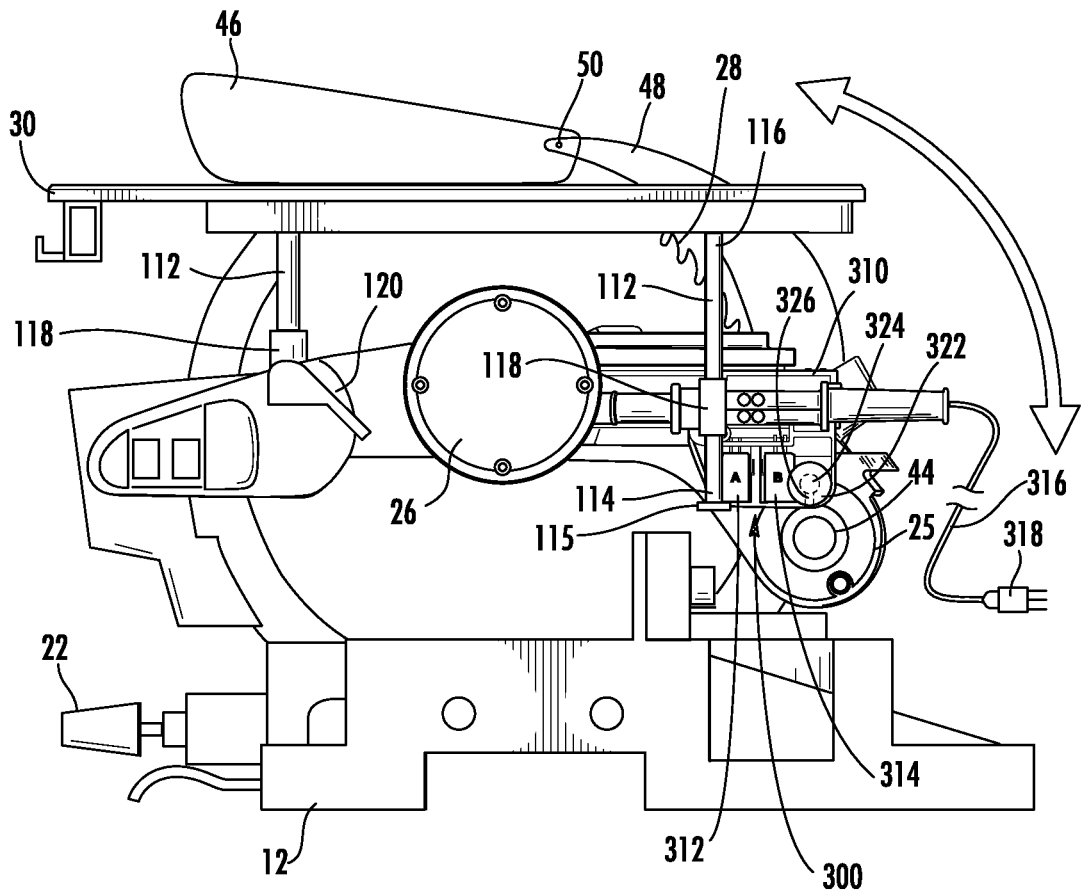
FIG. 12A is a side elevation view of a combination table-miter saw having a safety device according to another exemplary embodiment, shown in a table saw position with the table in an upper position.
Figure 12B:
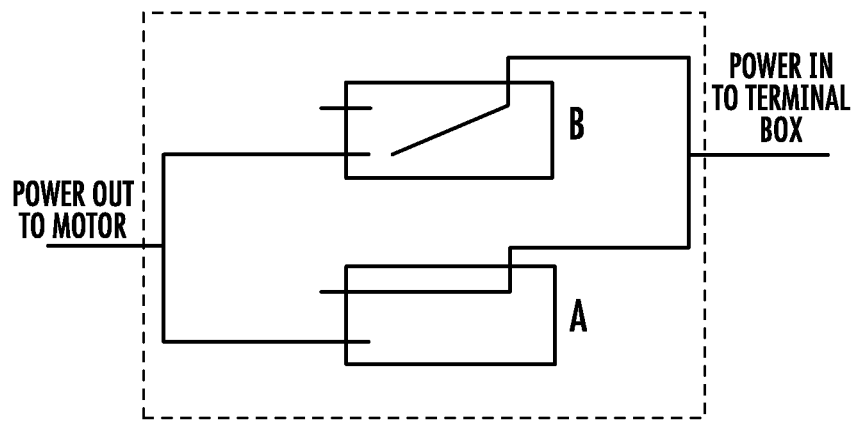
FIG. 12B is a schematic diagram relating to the safety device as shown in FIG. 12A.

As shown in FIG. 12A, the combination table-miter saw 10 is shown in the miter saw mode (i.e., the platform 30 is in a fully raised position and the locking device 320 is in an unlocked position). As shown in FIG. 12B, the switch 312 is in a closed state or position, allowing power coming into the terminal block to reach the saw unit 26. The switch 312 is closed when the projection 115 of the rod 112 engages the switch 312, (e.g., as shown in FIG. 12A).

On the other hand, as shown in FIG. 12A, the switch 314 is in an open state or position. This is because the locking device 320 is in an unlocked position where the locking device 320 does not engage the switch 314. However, because the switch 312 is closed (by the platform 30 being in the fully raised position causing the projection 115 to engage the switch 312), power is allowed to be delivered to the combination table-miter saw 10 so that it may be used in the miter saw mode.

Figure 13A:
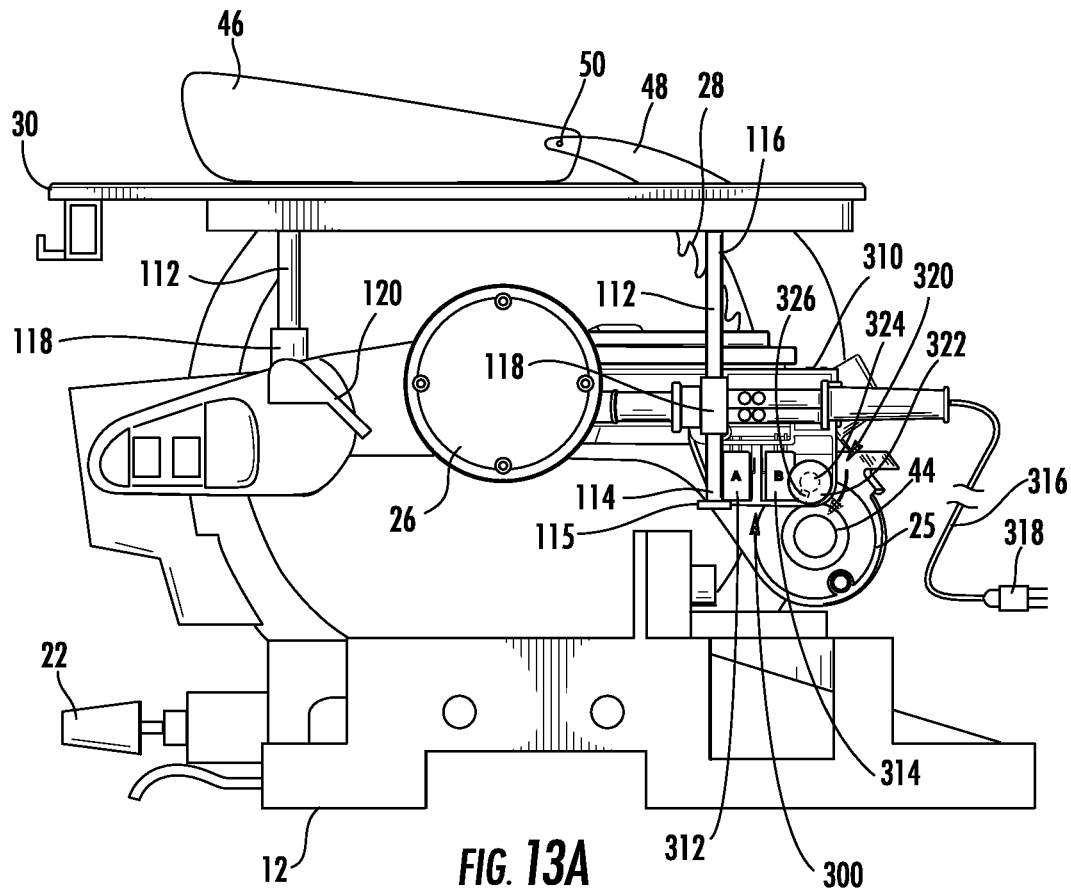
FIG. 13A is a side elevation view of the combination table-miter saw shown in FIG. 12A having a locking device shown in a locked position according to an exemplary embodiment.
Figure 13B:
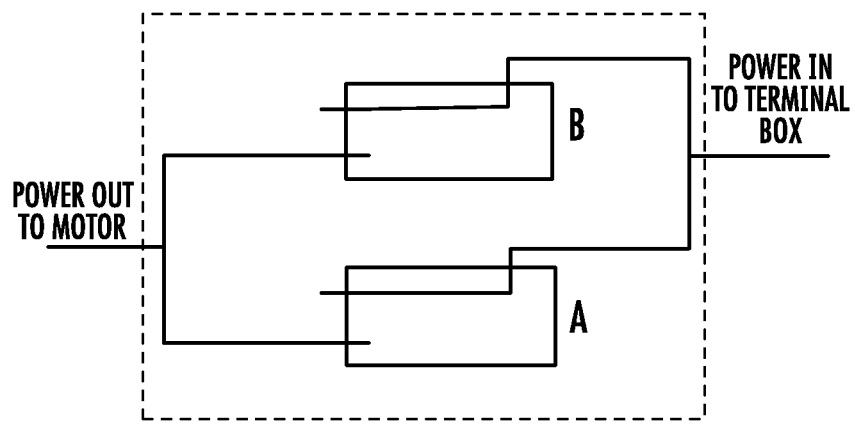
FIG. 13B is a schematic diagram relating to the safety device of FIG. 13A.

Referring now to FIGS. 13A and 13B, the locking device 320 has been moved into the locked position. Moving the locking device 320 into the locked position substantially locks the arm 24 of the combination table-miter saw 10 into the table saw position. Additionally, moving the locking device 320 into the locked position engages the switch 314 so that the switch 314 is closed. Since the platform 30 is still in a fully raised position, and the switch 312 is engaged (by the projection 115), the switch 312 is also in a closed position.

Figure 14A:
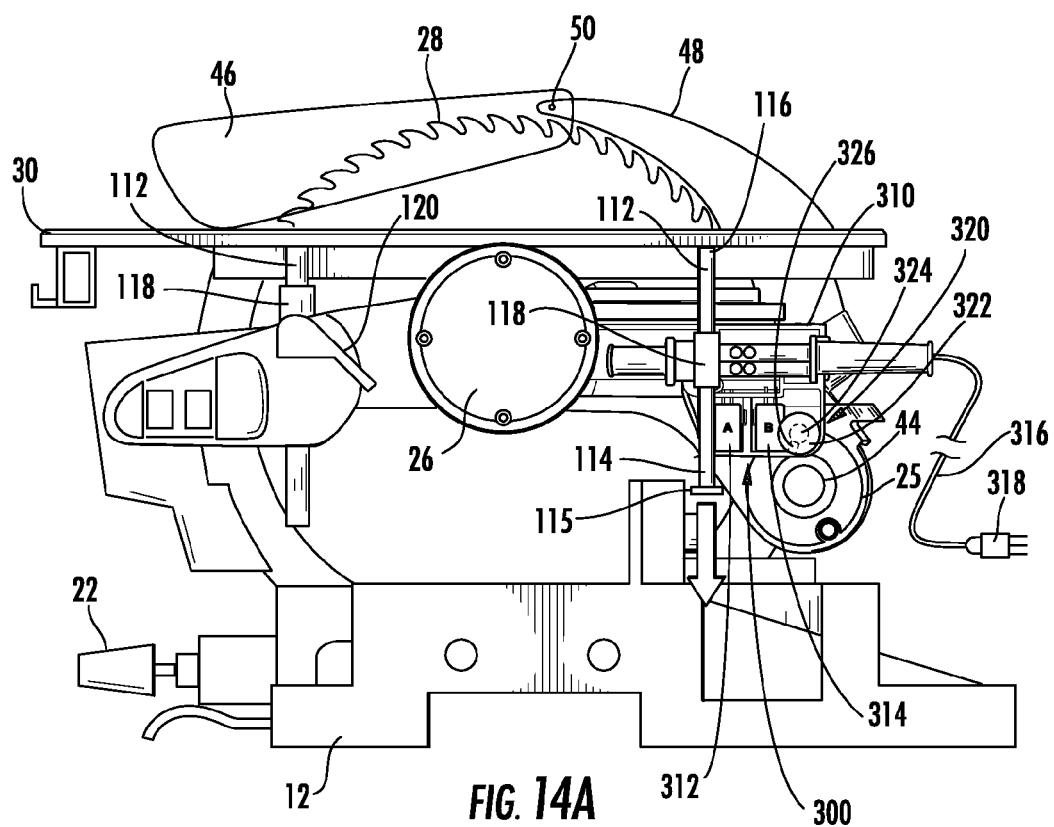
FIG. 14A is a side elevation view of the combination table-miter saw shown in FIG. 13A, with the table in a lower position.
Figure 14B:
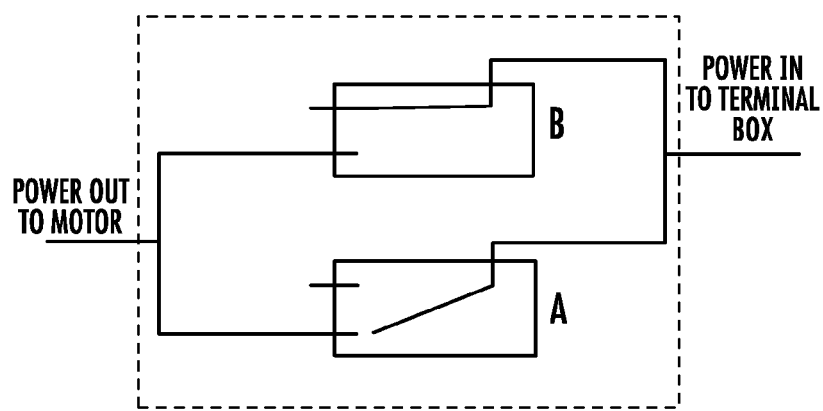
FIG. 14B is a schematic diagram relating to the safety device of FIG. 14A.

Once the platform 30 is lowered from its fully raised position (as shown in FIG. 14A), the switch 312 opens, as shown in FIG. 14B. However, since the locking device 320 is still in a locked position and engaged with the switch 314 causing the switch 314 to be closed, power is still allowed to be delivered to the saw unit 26 from the terminal box 310. Thus, the combination table-miter saw 10 may only be used in the table saw mode when the switch 314 is engaged by the locking device 320 and the switch 312 is open.

According to another exemplary embodiment, the safety system 300 may include a single switch (not shown) having the capability to monitor the position of both the platform 30 and the support arm 24. The single switch would be wired such that if either the platform 30 was in the fully raised position or if the arm 24 was locked in the table saw position, the single switch would allow power to be delivered to the saw unit 26.

Similar to switches 312, 314, the single switch may engage the projection 115 of the rod 112 to monitor or determine the position of the platform 30. Likewise, the single switch may engage the locking device 320 to monitor or determine the position of the arm 24. For example, the single switch may be engaged by the projection 115 when the platform 30 is in the fully raised position and not engaged by the projection 115 when the platform 30 is not in the fully raised position. Additionally, the single switch may be engaged by the locking device 320 when the locking device 320 is in a locked position (and the support arm 24 is in the table saw position) and not engaged by the locking device 320 when the locking device 320 is in an unlocked position (and the support arm 24 is not in the table saw position).

For the purpose of this disclosure, the terms "coupled," "connected," and the like mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any process or method steps may be varied or re-sequenced according to alternative embodiments.

It is important to note that the construction and arrangement of the combination table-miter saw safety system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Additionally, the components of the combination table-miter saw safety system may be constructed from any suitable and appropriate materials such as powdered metal, investment cast steel, metal injection molding (MIM), polymers, etc. Accordingly, all such modifications are intended to be included within the scope of the present application. Other substitutions, modifications, changes and omissions may be made in the design, operating conditions and arrangement of the exemplary embodiments without departing from the scope of the present application.

What is claimed is:

1. A combination table-miter saw comprising:
a base;
an arm rotatably coupled to the base and movable relative to the base between a first arm position and a second arm position;
a locking device movable between a locked position and an unlocked position, the locking device configured to prevent the arm from rotating when the locking device is in the locked position;
a platform slidably coupled to the arm via a support member, the platform movable relative to the arm between a first platform position and a second platform position; and
a safety device comprising:
a first switch monitoring the position of the platform, the first switch having a first state when the platform is in the first platform position, and the first switch having a second state when the platform is not in the first platform position; and
a second switch monitoring the position of the locking device, the second switch having a first mode when the locking device is in the locked position, and the second switch having a second mode when the locking device is not in the locked position;
wherein the safety device prevents operation of the combination table-miter saw when the first switch is in the second state and the second switch is in the second mode.

2. The combination table-miter saw of claim 1, wherein the first and second switches are micro-switches.

3. The combination table-miter saw of claim 1, wherein the safety device is configured such that power is provided to the combination table-miter saw for use as a miter saw when the first switch is in the first state.

4. The combination table-miter saw of claim 3, wherein the safety device is configured such that power is delivered to the combination table-miter saw for use as a miter saw only when the first switch is in the first state, and the second switch is in the second mode.

5. The combination table-miter saw of claim 1, wherein the safety device is configured such that power is delivered to the combination table-miter saw for use as a table saw when the second switch is in the first mode.

6. The combination table-miter saw of claim 5, wherein the safety device is configured such that power is delivered to the combination table-miter saw for use as a table saw only when the first switch is in the second state, and the second switch is in the first mode.

7. The combination table-miter saw of claim 1, wherein the safety device permits operation of the combination table-miter saw when the first switch is in the first state and the second switch is in the first mode.

8. The combination table-miter saw of claim 1, wherein the safety device prevents operation of the combination table-miter saw when the first switch is in the first state and the second switch is in the first mode.

9. The combination table-miter saw of claim 1, wherein the first state of the first switch is a closed state, and the second state of the first switch is an open state.

10. The combination table-miter saw of claim 9, wherein the first mode of the second switch is a closed mode, and the second mode of the second switch is an open mode.

11. The combination table-miter saw of claim 1, wherein a switch engages a projection of the support member to monitor the position of the platform.

12. A combination table-miter saw comprising:
a base;
an arm rotatably coupled to the base and movable relative to the base between a first arm position and a second arm position;
a locking device movable between a locked position and an unlocked position, the locking device configured to prevent the arm from rotating when the locking device is in the locked position;
a platform slidably coupled to the arm via a support member, the platform movable relative to the arm between a first platform position and a second platform position; and
a safety device comprising at least one switch monitoring at least one of the position of the platform and the position of the locking device, the at least one switch having a first switch state and a second switch state;
wherein the at least one switch is in the first switch state when the platform is in the first platform position, when the locking device is in the locked position, or when the platform is in the first platform position and the locking device is in the locked position;
wherein the at least one switch is in the second switch state when the platform is not in the first platform position and the locking device is not in the locked position; and
wherein the at least one switch is wired such that power is prevented from reaching the combination table-miter saw when the switch is in the second switch state.

13. The combination table-miter saw of claim 12, wherein the at least one switch is a micro-switch.

14. The combination table-miter saw of claim 12, wherein the at least one switch is a single switch monitoring the position of the platform and the position of the locking device.

15. The combination table-miter saw of claim 14, wherein the switch is wired such that power is delivered to the combination table-miter saw for use as a table saw or a miter saw when the switch is in the first switch state.

16. The combination table-miter saw of claim 12, wherein the first switch state is the switch being in an open position, and the second switch state is the switch being in a closed position.

17. The combination table-miter saw of claim 12, wherein the first switch state is the switch being in a closed position, and the second switch state is the switch being in an open position.

18. The combination table-miter saw of claim 12, wherein the switch engages a projection of the support member to monitor the position of the platform.

19. A method for providing a safety system for a combination table-miter saw, comprising:

providing a base;

providing an arm rotatably coupled to the base and movable relative to the base between a first arm position and a second arm position;

providing a locking device movable between a locked position and an unlocked position, the locking device configured to prevent the arm from rotating when the locking device is in the locked position;

providing a platform slidably coupled to the arm via a support member, the platform movable relative to the arm between a first platform position and a second platform position;

providing a safety device comprising:

a first switch monitoring the position of the platform, the first switch having a first state when the platform is in the first platform position, and the first switch having a second state when the platform is not in the first platform position; and a second switch monitoring the position of the locking device, the second switch having a first mode when the locking device is in the locked position, and the second switch having a second mode when the locking device is not in the locked position;

wherein the safety device prevents operation of the combination table-miter saw when the first switch is in the second state and the second switch is in the second mode.

20. The method of claim 19, wherein the safety device is configured such that power is delivered to the combination table-miter saw when at least one of the first switch is in the first state and the second switch is in the first mode.

* * * * *